US005623624A

United States Patent [19]

Holland et al.

[11] Patent Number: 5,623,624

[45] Date of Patent: Apr. 22, 1997

[54] MEMORY CONTROL ARCHITECTURE FOR HIGH SPEED TRANSFER OPTIONS

[75] Inventors: Stephen Holland; Gregory L. Tucker, both of Boise, Id.

[73] Assignee: Micron Technology, Inc., Boise, Id.

[21] Appl. No.: 360,865

[22] Filed: Dec. 20, 1994

Related U.S. Application Data

[63] Continuation of Ser. No. 12,094, Feb. 1, 1993, abandoned.

[51] Int. Cl.[6] .......... G06F 3/14

[52] U.S. Cl. .......... 395/432; 395/507; 395/525; 364/DIG. 2

[58] Field of Search .......... 395/432, 164

[56] References Cited

U.S. PATENT DOCUMENTS

| | | | |
|---|---|---|---|
| 4,891,794 | 1/1990 | Hush et al. | 365/189.04 |
| 5,036,475 | 7/1991 | Ueda | 395/164 |
| 5,202,962 | 4/1993 | Matsuo et al. | 395/166 |
| 5,218,674 | 6/1993 | Peaslee et al. | 395/166 |
| 5,265,204 | 11/1993 | Kimura et al. | 395/166 |
| 5,392,391 | 2/1995 | Caulk, Jr. et al. | 395/162 |

OTHER PUBLICATIONS

Zimmerman et al., Fastbus Readout Controller Card for High Speed Data Acquisition, 1991 Nuclear Science Symposium and Medical Imaging Conference, pp. 794–798.

*Primary Examiner*—Robert B. Harrell
*Assistant Examiner*—Kenneth R. Coulter
*Attorney, Agent, or Firm*—Trask, Britt & Rossa

[57] ABSTRACT

A subsystem architecture for direct memory access of random access memory (RAM) which performs block transfers of adjacent units of memory from one memory location to another. The architecture comprises a RAM array with write enable capability, serial access memory (SAM) registers, an alignment unit, and controller. An embodiment is described which performs bit-block transfers (BitBLTs) of pixel data within a graphical user interface (GUI) subsystem which utilizes Triple-ported Dynamic RAM (TPDRAM). The BitBLT is broken up into four cycles which handle the transfer of all possible combinations of units of adjacent memory utilizing the entire bandwidth of the port writing to RAM. The architecture allows operations to be pipelined.

18 Claims, 9 Drawing Sheets

MEMORY CONTROL ARCHITECTURE FOR HIGH SPEED TRANSFER OPTIONS

PRIOR APPLICATION

This is a continuation application of Ser. No. 08/012,094 filed Feb. 1, 1993, now abandoned.

FIELD OF THE INVENTION

This invention relates to digital system architecture and, more particularly, to improving the speed of data transfers within random access memory (RAM). A typical application of this invention is accelerating bit-block transfers within a memory array storing pixel data for a graphical user interface subsystem or any other direct memory access type application.

BACKGROUND OF THE INVENTION

Computers and other electronic equipment use random access memory (RAM) to store information. Often times during operation, data in one portion of memory must be written, moved or transferred to another portion. Frequently, this involves large blocks of data. A problem occurs when these transfers impact significantly on the speed with which a system performs.

Nowhere is this problem more apparent than in graphical user interface (GUI) subsystems such as computer screen displays where memory serves as a digital representation of the screen. Changing what appears on the screen involves changing the data in the memory array.

Oftentimes, certain images on the screen are merely being copied from one location in memory and written to another. A bit-block transfer (BitBLT).operation accomplishes the necessary change in memory by reading data from one location of a memory array, and then writing it to another location. Current personal computer software applications such as Microsoft's WINDOWS make extensive use of these types of transfers.

A typical subsystem might serve a screen of 1024×768 pixels, each of which might be represented in memory as an 8-bit color/intensity value. Pixels can in turn be grouped into pixel words, depending on the system architecture. For instance, in a 32-bit machine, four 8-bit pixels may be conveniently grouped into one 32-bit pixel word.

For example, a computer screen is divided into an array or grid of pixels, 768 rows by 1024 columns. The information concerning the color/intensity for each pixel at a given time is stored in a RAM array frame buffer, as shown in FIG. 1, where 8-bit pixels are grouped into pixel-words having 4 pixels per pixel-word.

FIG. 2 shows the upper left portion of the frame buffer memory array wherein each pixel-word is composed of four pixels in adjacent columns. Suppose we wish to transfer pixels C-J from their current position in row 0 to a destination in row 3. Since the architecture deals in pixel-words, a potential problem occurs when the source address of a pixel falls in a different position within a pixel-word than does the destination address. In this case, pixel C shifts from position 2 in its source pixel-word to position 1 in its destination pixel-word.

Another potential problem occurs when the location of the beginning or ending pixel in a block of pixels to be transferred is not on a pixel-word boundary. When the number of pixels being transferred is not divisible evenly by four (i.e. not modulo 4), some part of the block, either the beginning or the end or both, will not fall cleanly on a pixel-word boundary.

The subsystem architecture must be designed to handle all the possible situations which can arise when a block of data to be transferred is not aligned cleanly on pixel-word boundaries. The more complex data manipulations required for these unaligned BitBLT's can further sap system resources.

Since BitBLT's are a significant factor in overall GUI subsystem performance, increasing their speed improves the system.

Current solutions to the problem include the development of several coprocessed graphics cards having a block transfer engine such as the 8514A and XGA, both developed by IBM, Inc., and the S3 Accelerator, developed by S3, Inc.

These solutions utilize only a single port into the RAM array, and therefore both read and write access operations must occur through that port. It would be advantageous to have an architecture which might utilize more than one port in performing memory access operations.

SUMMARY OF THE INVENTION

The principal and secondary objects of this invention are to provide an architecture for performing Bit-block transfers within a RAM array with far greater speed and efficiency over current solutions.

These and other objects are achieved by a RAM array allowing write enables for each unit of interest (pixels in the GUI example), in combination with serial access memories for each data-unit of interest, and a controller. An alignment unit is necessary for accomplishing unaligned transfers. A given transfer is broken up into four cycles which handle all the possible combinations of units of adjacent memory making up the block. Also, operations comprising each of the cycles may be pipelined.

Although development of this invention was initiated by the problems inherent in GUI subsystems, the invention itself accelerates direct memory access operations. As such, this invention may enhance any system which performs these types of operations.

The architecture can be implemented on a single integrated circuit chip or by combining existing off-the-shelf components.

DESCRIPTION OF THE PREFERRED EMBODIMENTS OF THE INVENTION

This preferred embodiment describes using the invention in a GUI subsystem setting as an example. It in no way restricts the architecture from being utilized in other direct memory access (DMA) applications where memory is made up of data-units grouped into data-words and transfers are required involving groups of data-units-not necessarily on data-word boundaries. The numbers used for memory array size, pixel depth, pixel-word length, etc. have been chosen to agree with each other; however, the architecture can easily be modified to accommodate any variation in these numbers.

Similar to the example above, a computer screen is divided into an array or grid of pixels, 1024 rows by 1024 columns. The information concerning the color/intensity for each pixel at a given time is stored in a RAM array frame buffer, 8-bits per pixel and 4 pixels per pixel-word.

Figure 1:
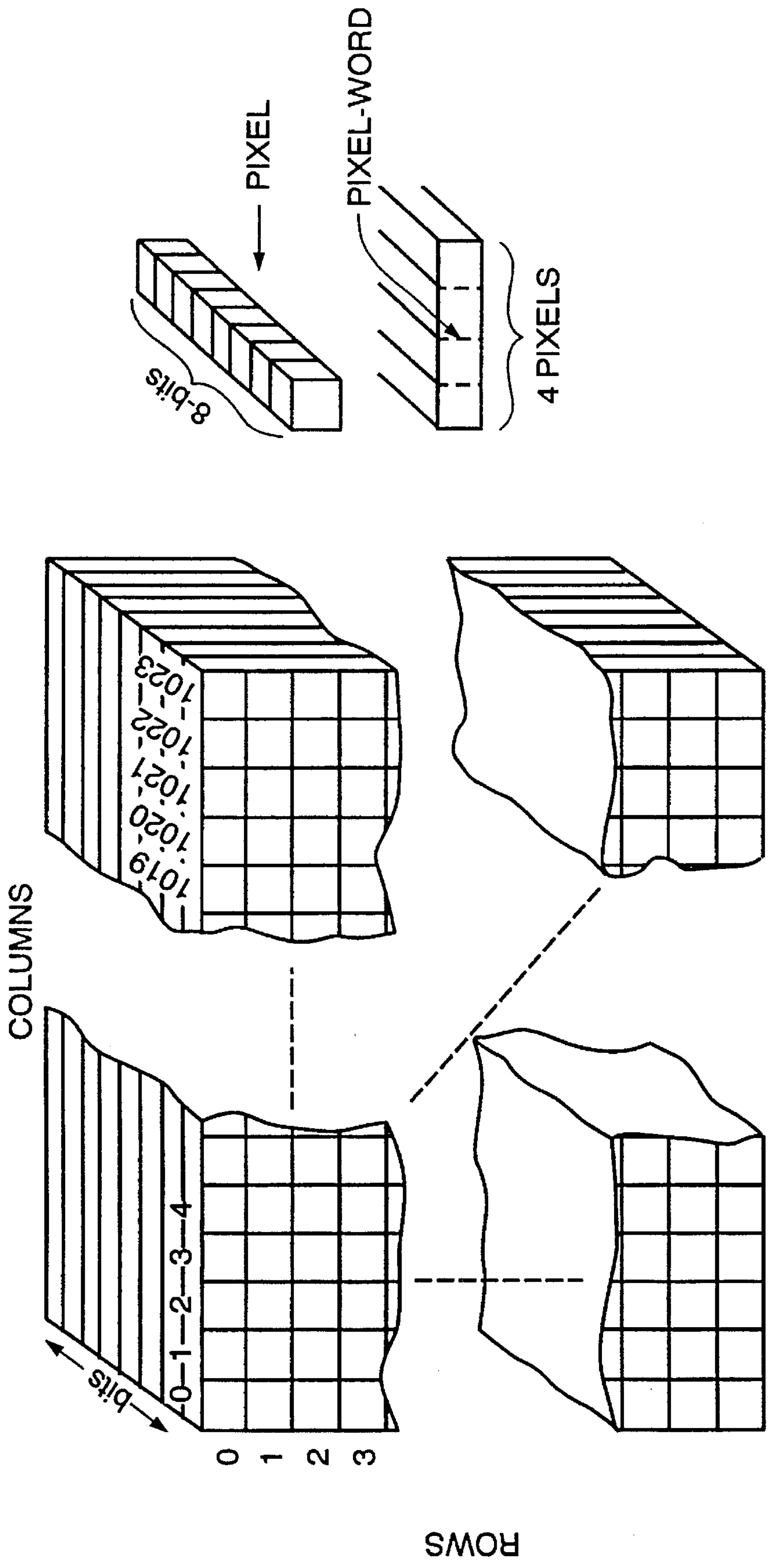
FIG. 1 is a three-dimensional diagrammatical representation of the RAM frame buffer.
Figure 2:
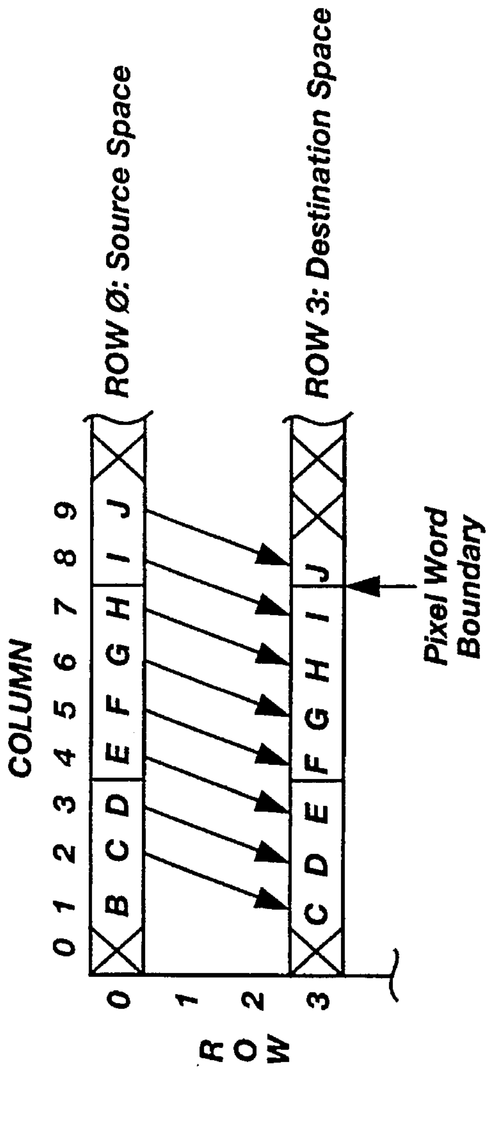
FIG. 2 is a diagram of the upper left portion of frame buffer memory showing a transfer of a row of pixels.
Figure 3:
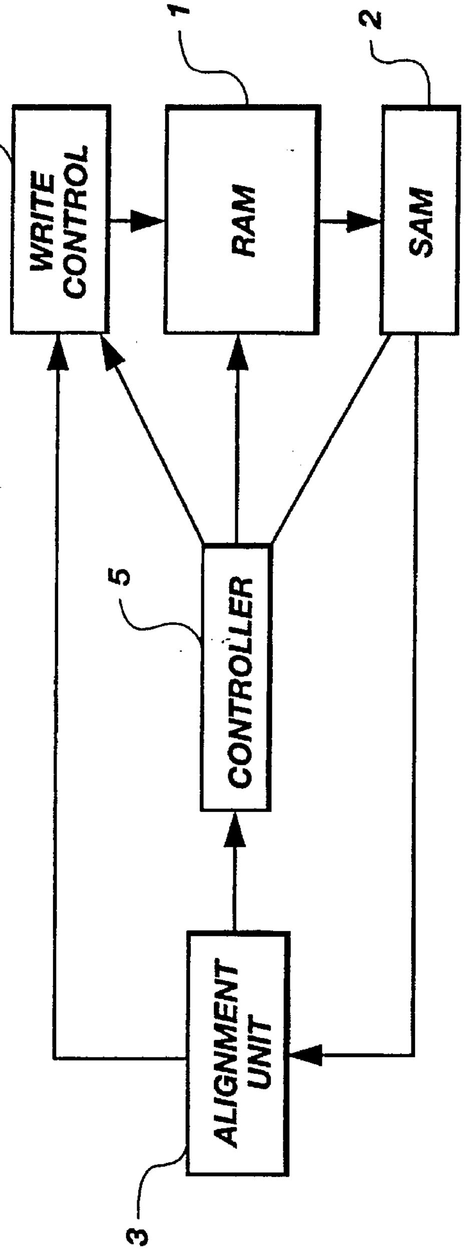
FIG. 3 is a block diagram of the data flow using the invention.

Referring now to the drawing, FIG. 3 shows a block diagram of data flow during a BitBLT. In a typical bit-block transfer (BitBLT), pixel data is read from the RAM array 1, written into a group of SAM shift registers 2 and then clocked out, word by word through the alignment unit 3. Word by word, aligned pixel-words are written back into the RAM array through RAM write control 4 to their proper destination addresses.

The alignment unit may be designed with a pipeline register which allows the transfer to be split up into concurrently running operations. Data can be clocked out of the SAM and into the alignment unit while previously aligned data is being clocked out of the alignment unit into the RAM. Because the unit uses a pipeline register, the unit also adds one pipeline delay to the BitBLT pixel data path.

Overseeing these operations is a controller 5 which needs only the source and destination pixel addresses, the number of pixels being transferred along with the number of pixels in a pixel word to calculate and implement the proper sequence of operations to effect the transfer.

In order to calculate the alignment unit's shift, the controller compares the source and destination pixel positions. Since there are four pixels per pixel-word, the two least significant bits (LSBs) of a pixel's address are used to determine the pixel position within the pixel-word. The first three columns of Table 1 show the amount of left shift performed by the alignment unit for all possible combinations of source and destination pixel positions according to their LSB's. Once the left shift is known, the controller can generate the appropriate shift field and the alignment unit can apply it, thereby shifting the pixels from their source configuration into the destination configuration.

TABLE 1

Mask logic truth table

| Source Address LSBs | Dest. Address LSBs | Left Shift | FIRST Count Enable | MEMORY WrEn Mask 0123 | CYCLE SerClk Mask 0123 | SECOND Count Enable | MEMORY WrEn Mask 0123 | CYCLE SerClk Mask 0123 |
|---|---|---|---|---|---|---|---|---|
| 3 | 3 | 00 | 1 | 0001 | 1111 | 1 | 1111 | 1111 |
| 3 | 2 | 01 | 0 | 0010 | 1111 | 1 | 0001 | 1000 |
| 3 | 1 | 10 | 0 | 0100 | 1111 | 1 | 0011 | 1100 |
| 3 | 0 | 11 | 0 | 1000 | 1111 | 1 | 0111 | 1110 |
| 2 | 3 | 11 | 1 | 0001 | 1110 | 1 | 1111 | 1111 |
| 2 | 2 | 00 | 1 | 0011 | 1111 | 1 | 1111 | 1111 |
| 2 | 1 | 01 | 0 | 0110 | 1111 | 1 | 0001 | 1000 |
| 2 | 0 | 10 | 0 | 1100 | 1111 | 1 | 0011 | 1100 |
| 1 | 3 | 10 | 1 | 0001 | 1100 | 1 | 1111 | 1111 |
| 1 | 2 | 11 | 1 | 0011 | 1110 | 1 | 1111 | 1111 |
| 1 | 1 | 00 | 1 | 0111 | 1111 | 1 | 1111 | 1111 |
| 1 | 0 | 01 | 0 | 1110 | 1111 | 1 | 0001 | 1000 |
| 0 | 3 | 01 | 1 | 0001 | 1000 | 1 | 1111 | 1111 |
| 0 | 2 | 10 | 1 | 0011 | 1100 | 1 | 1111 | 1111 |
| 0 | 1 | 11 | 1 | 0111 | 0111 | 1 | 1111 | 1111 |
| 0 | 0 | 00 | 1 | 1111 | 1111 | 1 | 1111 | 1111 |

If both the source and destination positions are in the same part of the pixel-word, the transfer needs no shifting, and the alignment unit simply passes the data through "as is".

Since whole pixel-words get written to memory, a write enable mask is required to prevent pixels within the addressed pixel-word but not contained in the destination space from being inadvertently changed. This pixel masking of the destination memory area is determined by the source and destination addresses and which pixel-word is being written.

A thorough study of all possible combinations of source and destination addresses and the number of pixels to be transferred reveals that a multi-stage transfer operation is required. The invention implements a BitBLT in four separate stages. The first two stages build at least the first pixel-word in destination space. The third or middle stage performs the transfer of all the full pixel-words in the middle of the block being transferred. The fourth stage performs the writing of the last pixel-word, which is sometimes partial.

All but the third stage use a write enable mask for each pixel in the pixel-word. The first two stages also require a SAM serial clock mask so that only certain pixels are clocked out of the respective SAM registers. A pixel count enable mask must also be used to keep the pixel counter and destination address column counter on track with the number of pixels transferred. These first two seemingly tedious stages are required so that the middle stage can transfer the middle pixel-words at the full bandwidth of the RAM write hardware. The values for each of these masks, based on the source and destination address LSB's and the current transfer cycle, are revealed in the remainder of Table 1.

FIG. 4 shows a more detailed example of our same BitBLT as broken down into these four stages. Again, the transfer of pixels C-J is to be made from their source row 0 to their destination row 3. The LSB's of the source address show position 2, and the LSB's of the destination show position 1. Using these two parameters, Table 1 gives the left shift and all the mask values needed for cycles one and two.

Since the first, second and fourth stages are one cycle long, they maybe alternatively referred to as cycles. The middle stage can be many cycles.

The First Cycle The LSBs of the source and destination pixel addresses are used to form several masks that are used during the first two cycles of the BitBLT operation. As shown in the example in FIG. 4, it is sometimes necessary to mask off one or more of the left-most pixels in the first pixel word to be written into the destination address. This mask operation is implemented by deasserting the write enable during the write operation to the first pixel word in the destination.

Also illustrated in the example, there exist scenario's where the first pixel word in the destination space must actually be built from both the first and second pixel words in the source space. A counter is used to generate the column portion of the destination address during a BitBLT. If the first two pixel words in the source are required to build the first pixel word in the destination space, then the column and pixel counter must be the same during the first two cycles. The Count Enable field in Table 1 indicates what scenarios cause this to happen.

Figure 4A:
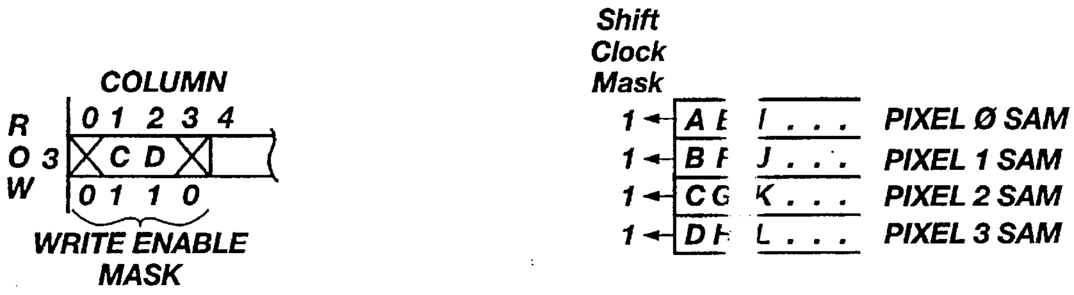
FIG. 4 shows a step by step example of a BitBLT using the invention.

It is preferable to write full pixel-words during the middle cycles. A mask is applied to the serial clocks for the SAM registers to keep the controller from having to build each pixel word in the destination space similar to the first two cycles of the BitBLT. By correctly masking the serial clocks, the column pointers for each pixel within the pixel word are set so that during the middle cycles, the correct pixels are identified and all pixels can be clocked simultaneously for the remainder of the transfer operation. Table 1 indicates the serial clock mask operation during the first two cycles for each of the address scenarios. FIG. 4*a* shows the state of the destination space and the SAM registers after the first cycle.

Figure 4B:
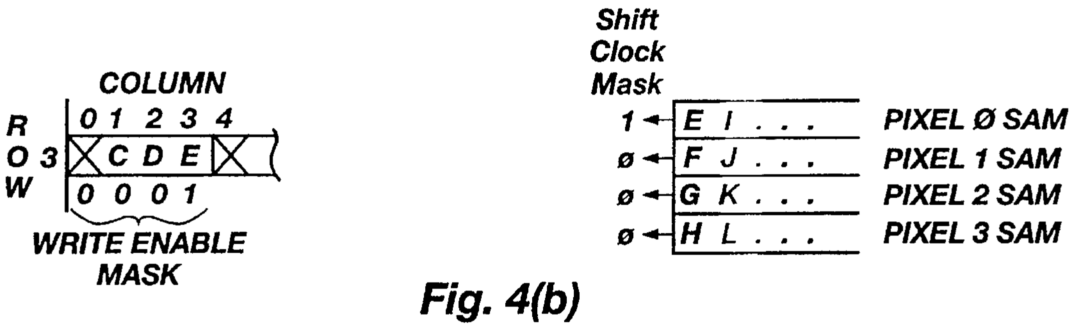

The Second Cycle of the BitBLT operation is similar to the first cycle, The controller masks write-enable and serial-clock for each pixel based on the source and destination address LSBs. The column and pixel counter is allowed to advance in all cases because at the end of the second cycle, at least the first pixel word of the destination space has been transferred, Second cycle operation is the same as the first cycle, FIG. 4*b* shows how both the write enable and shift clock masks are used to complete the update of the first pixel word in the destination space and set up the SAM registers for the middle cycles.

Figure 4C:
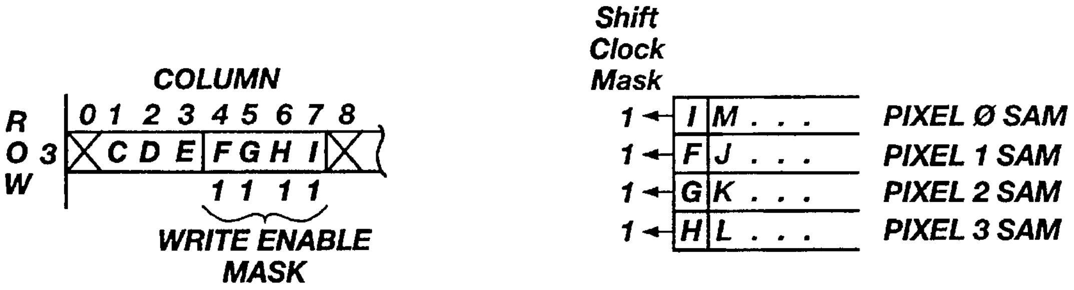

The Middle Cycle The first two cycles of the BitBLT handle all of the masking required to write at least the first pixel word and align the SAM pointers for each pixel within the pixel word so that during the middle cycles no masking is required and the controller can transfer pixels at the full bandwidth of the RAM write circuitry. For each remaining pixel-word, the SAM registers are clocked, the pixel word is output and subsequently aligned, and then written into the RAM array at the destination address. This continues until the pixel counter has counted down to one, where the ending cycle begins. FIG. 4*c* shows a typical middle cycle. Note how the alignment value affects the pixel position within the destination space.

Figure 4D:
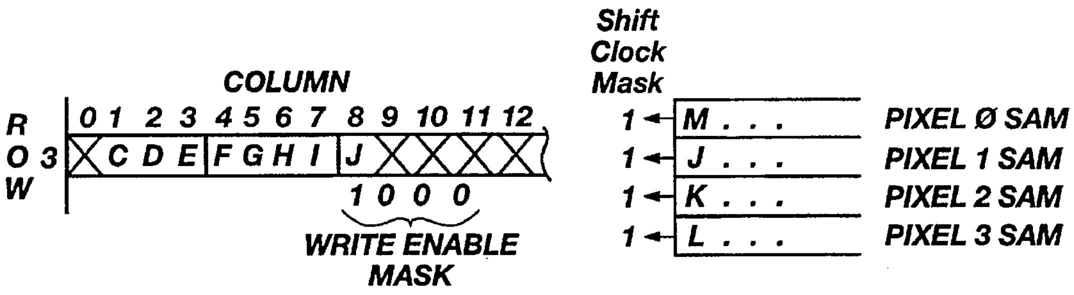

The Ending Cycle Depending on the destination address and the number of pixels being transferred, a write-enable mask is sometimes required to correctly transfer the last pixel word into the destination space. When the pixel word counter has counted down to a value of one, the destination address LSBs and pixel count LSBs are evaluated to determine how many transfer cycles are required to complete the BitBLT operation and what the write-enable mask should be for the last pixel word. Table 2 lists the possible scenarios. FIG. 4*d* shows how the write enable mask is used.

TABLE 2

Ending cycle write enable mask truth table

| Destination LSBs | Number Pixels MOD 4 | Remaining Pixel-Word count | Ending Write Enable Mask 0123 |
|---|---|---|---|
| 00 | 0 | 1 | 1111 |
| 01 | 0 | 2 | 1000 |
| 10 | 0 | 2 | 1100 |
| 11 | 0 | 2 | 1110 |
| 00 | 1 | 2 | 1000 |
| 01 | 1 | 2 | 1100 |
| 10 | 1 | 2 | 1110 |
| 11 | 1 | 2 | 1111 |
| 00 | 2 | 2 | 1100 |
| 01 | 2 | 2 | 1110 |
| 10 | 2 | 2 | 1111 |
| 11 | 2 | 3 | 1000 |
| 00 | 3 | 2 | 1110 |
| 01 | 3 | 2 | 1111 |
| 10 | 3 | 3 | 1000 |
| 11 | 3 | 3 | 1100 |

Figure 5:
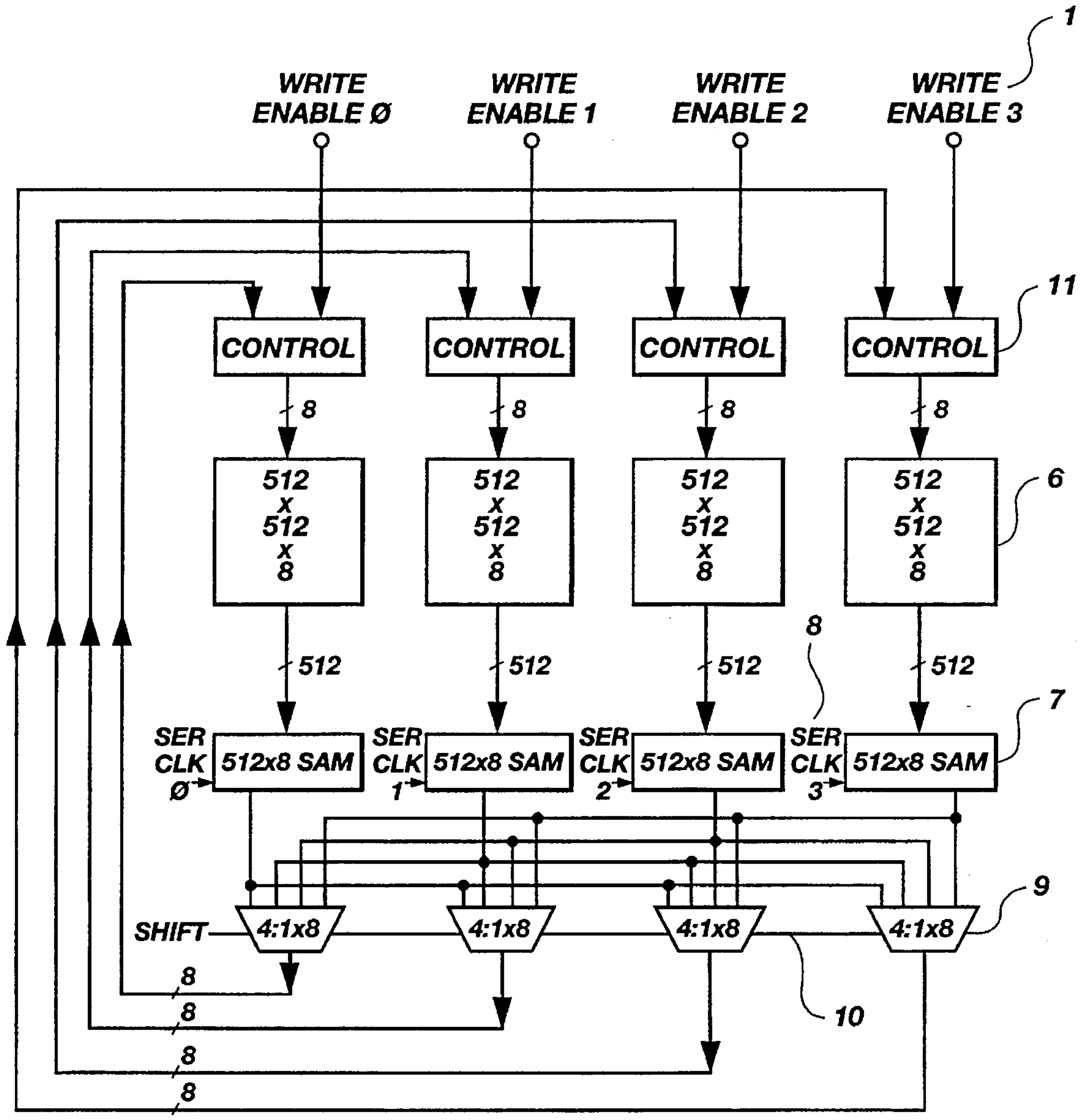
FIG. 5 is a detailed block diagram of the data path architecture.

FIG. 5 shows a typical pixel data path architecture for this example which uses the above described BitBLT procedure. A one-megabyte RAM array 6 is represented as four arrays of 512×512×8 bits, each representing memory for a particular pixel position. To each of these memory arrays is connected a 512×8 SAM shift register 7 which gets loaded with a row of pixels during a BitBLT. A serial clock 8 tells each SAM when to clock out its pixel. The four eight-bit wide 4:1 multiplexers 9 act as a pixel rotation unit, thereby implementing the alignment unit. A two-bit shift field 10 based on the source and destination address LSB's and specified in table 1 indicates what rotation of the pixel word is required to meet the alignment requirements going into the RAM write circuitry 11. The write enable 12 for each pixel position determines whether the pixel entering that position from the alignment unit 9 gets written to memory 6.

Figure 6:
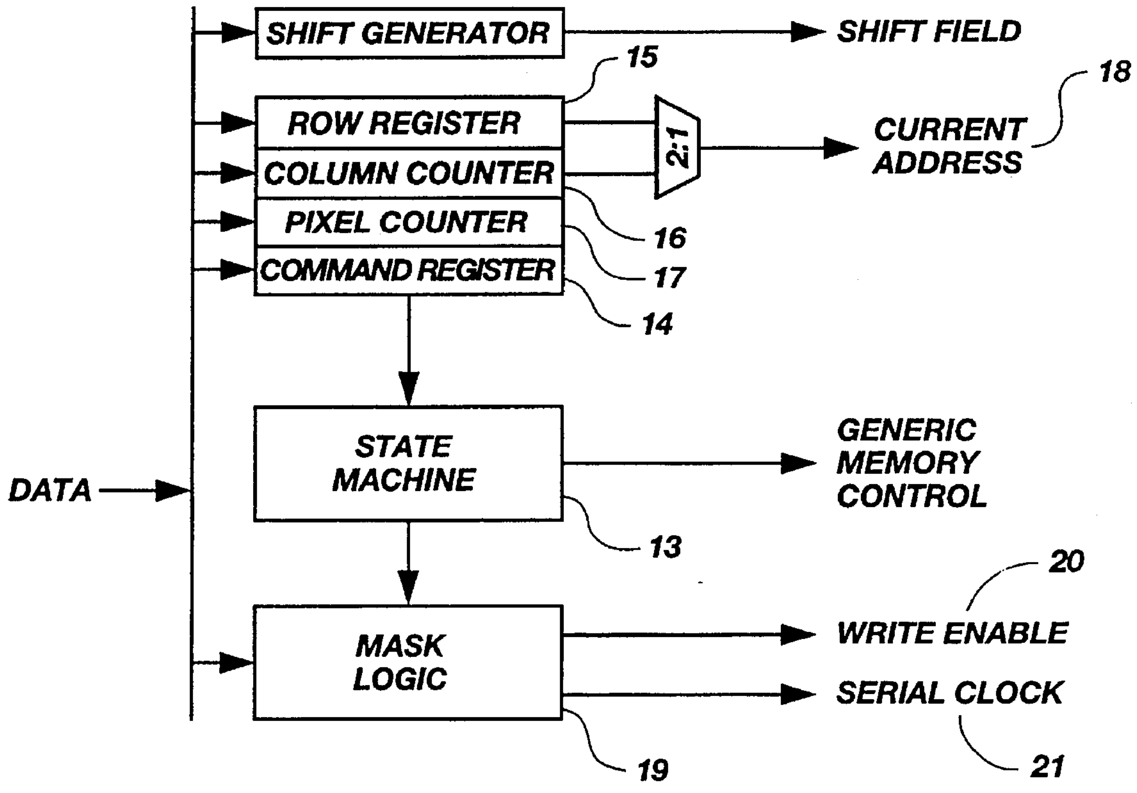
FIG. 6 is a block diagram of a generic controller required in the invention.

In order to implement these operations, the controller needs to generate the proper signals, clocks and masks at the proper times as required by the other circuitry. FIG. 6 shows a block diagram of a generic controller built around our GUI example.

The controller is centered around a state machine 13 which generates control for each cycle of the transfer. It uses the command register 14 to specify the type of control cycle desired. It also uses the row register 15 to keep track of the destination row, the column counter 16 to generate and keep track of the current destination column address for writing to RAM, and the pixel counter 17 to know the point to which the transfer has progressed. The row register and column counter together form the destination address 18. The state machine generates the write enables 20 and serial clocks 21 for each pixel in the pixel word, applying the appropriate masking based on the mask generation circuitry 19.

The controller can be implemented as a memory mapped device for purposes of control by a system processor, but could receive communication through a number of means depending on the graphic subsystem design. In other words, control of the controller can be accomplished through many means available in the art, but the invention lies in how the controller guides BitBLT's.

Figure 7:
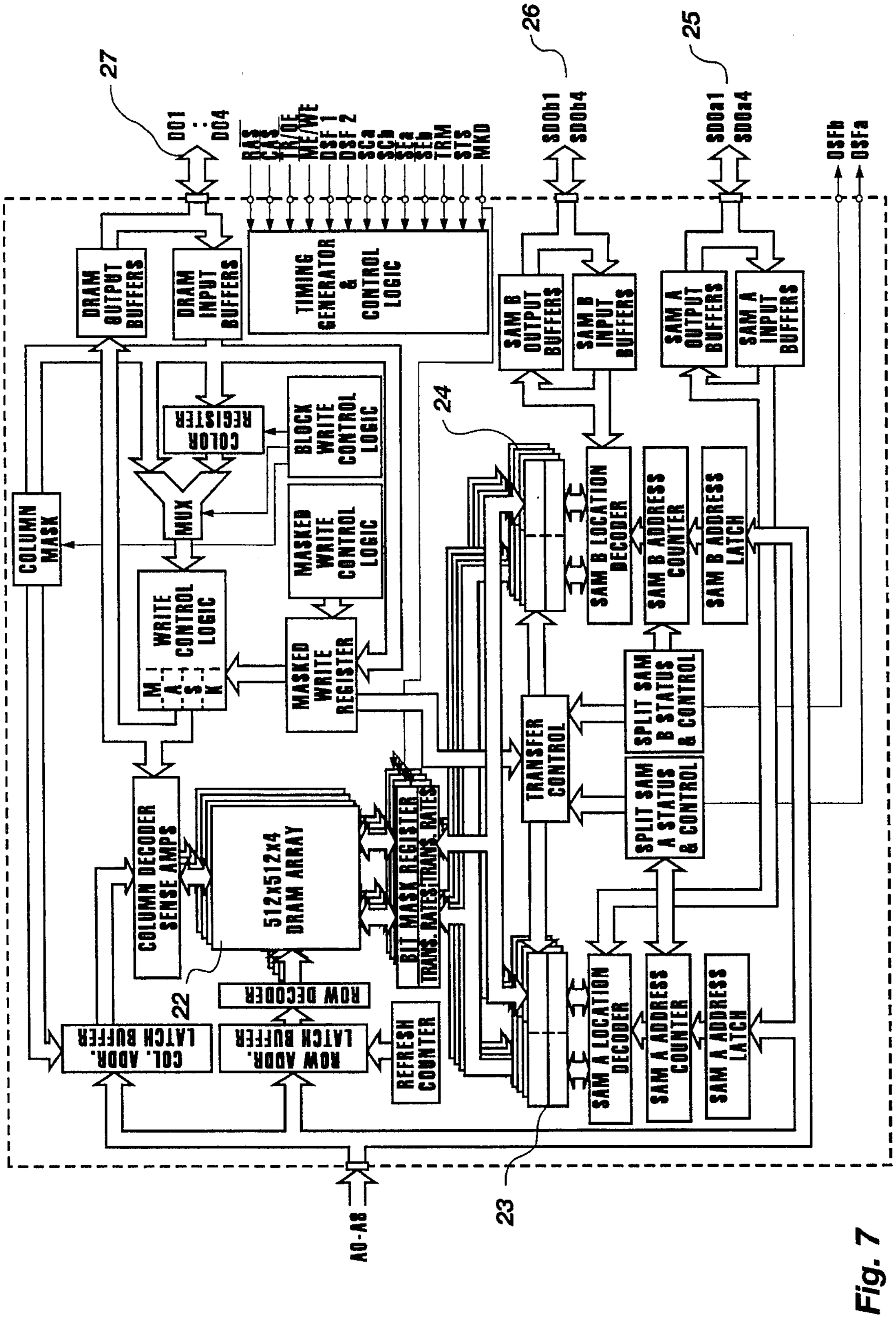
FIG. 7 is a detailed block diagram of a TPDRAM assembly.

A specific implementation of the invention can be realized using existing hardware in the form of the Micron Triple-Ported Dynamic RAM (TPDRAM). The inherent capabilities of TPDRAM make it uniquely suited to this application. As seen in FIG. 7, the TPDRAM has an onboard 512×512×4 DRAM array 22 which is connected to two 512×4 SAM's, SAMa 23 and SAMb 24 which are connected, respectively to two serial ports 25 and 26. Additionally, the TPDRAM has a bi-directional random access port 27. Eight TPDRAM devices are combined in parallel to form the necessary 512×512×32 frame buffer memory.

Figure 8:
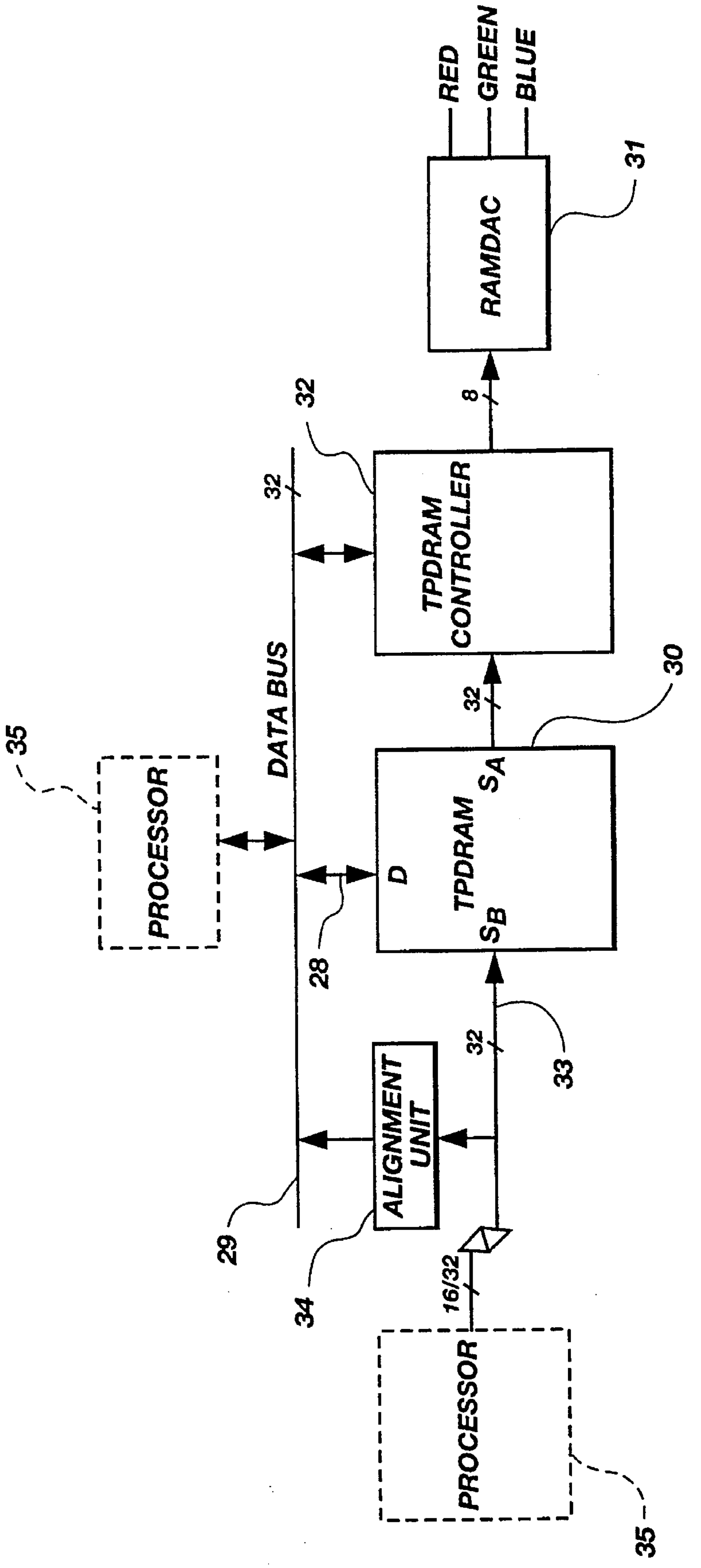
FIG. 8 is a system block diagram utilizing a TPDRAM as a GUI frame buffer.

FIG. 8 shows the TPDRAM implemented within a GUI subsystem. Here, the TPDRAM's random port 28 is connected to a system data bus 29. SAMa 30 is devoted exclusively to supplying a stream of pixel data to the video display circuitry 31 via the TPDRAM controller 32.

SAMb 33 is used as the SAM registers during BitBLT's. Pixel data can be clocked out of SAMb by the controller into an outboard alignment unit 34, then returned to the DRAM array via the random port 28 for direct writing to the DRAM array.

Since it is typically part of a larger system, the subsystem may have connections to processor 35 which can connect to the TPDRAM through either the serial-or random port.

Figure 9:
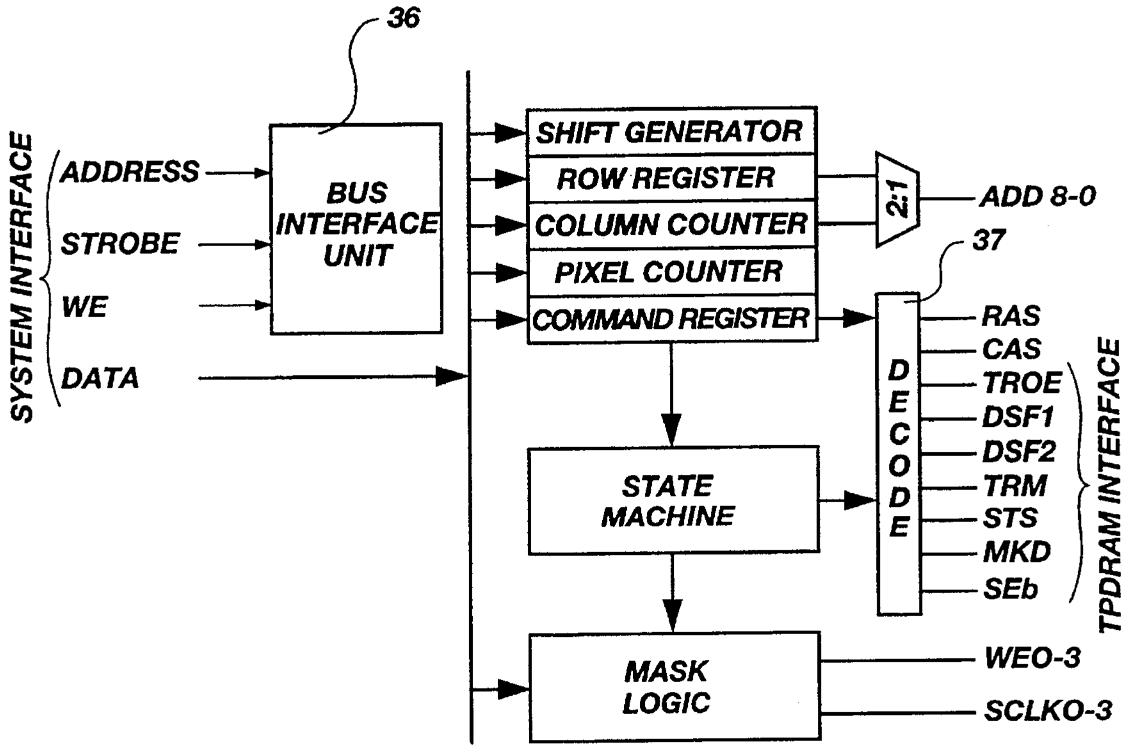
FIG. 9 is a block diagram of the controller which implements the TPDRAM.

Turning to FIG. 9, the controller described earlier has been slightly modified to interface with the requirements of the TPDRAM. Most notable are the data bus interface unit 36 and the TPDRAM interface decode unit 37 which generates signals required to operate the TPDRAM.

Figure 10:
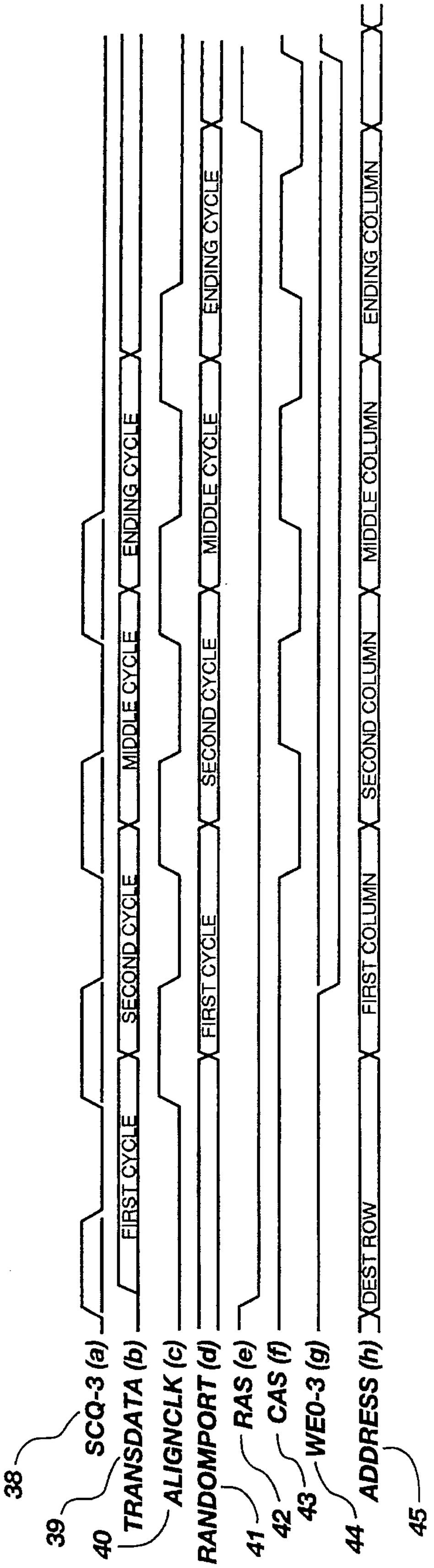
FIG. 10 is a timing diagram of the signals on selected lines during a BitBLT.

FIG. 10 shows the signals appearing on selected lines of the controller and TPDRAM during a typical BitBLT. These include:

- the serial clocks 38 which, of course, is subject to masking on the first two transfer cycles,
- data coming out of SAMb 39,
- an alignment clock 40 used to register data into the alignment unit,
- data coming out of the alignment unit and into the random port 41,
- the row address strobe (RAS) 42 which opens the destination row in the TPDRAM for writing,
- the column address strobe (CAS) 43 which specifies the destination column address of each pixel-word written (note that the write begins when CAS falls, the destination address is present and the aligned pixel-word is present at the inputs of the random port),
- the write enables coming into the random port 44 which are subject to masking on all but the middle cycles, and
- the address 45 coming from the row and column register.

Pseudo-code commands from the processor to the controller to accomplish the BitBLT in our example might look like this:

```
LOAD SAMb (source X = 2, source Y = 0)
WAIT FOR COMPLETION
TRANSFER PIXELS (destination X = 1, destination Y = 3,
    # of pixels = 8)
WAIT FOR COMPLETION
```

The command LOAD SAMb transfers the entire row from the left-most pixel address of the source specified by (X=2, Y=0) in the DRAM array into SAMb and sets the SAMb column pointer to the left most pixel in source space.

Since commends to the TPDRAM cannot be queued up, the controller must WAIT FOR COMPLETION of the SAM transfer in order to know when to initiate the next command.

The TRANSFER PIXELS command causes the controller to clock the pixels-out of the SAMb registers, through the alignment unit and into the random port, beginning at the destination address specified by (destination X=1, destination Y=3) for # of pixels=8.

Every time the screen is refreshed (typically 72 times a second), the memory controller must read from the frame buffer the values for all the pixels being displayed. Also, due usually to the physics of memory cell construction, DRAM arrays must be regularly refreshed (DRAM refresh) to retain information in seldom accessed memory. Both of these operations take precedence and can interrupt a BitBLT. Afterwards, the controller is able to restart the transfer where it left off.

In this embodiment, BitBLT's involving more than one row of data require successive single row BitBLT operations on successive rows. However, the circuitry could be easily enhanced by adding an outer control loop which performs BitBLTs of multiple rows of multiple columns of pixels. This would require converting the row register in the controller to be a counter that increments at the completion of each row BitBLT and uses a separate pixel row counter that decrements to zero as each row is transferred.

In addition to BitBLT's, the SAM ports also perform page mode transfers at twice the speed of the random port. This mode is useful for high bandwidth asynchronous data transfers such as pattern fill operations. These types of transfers are handled in a Bi-directional manner with both read and write operations occurring through SAM.

The TPDRAM also offers memory cycles that allow powerful macro-level routines that can operate on one or two display lines simultaneously, thereby giving the graphics programmer added control and functionality.

While the preferred embodiments of the invention have been described, modifications can be made and other embodiments may be devised without departing from the spirit of the invention and the scope of the appended claims.

What is claimed is:

1. A memory access architecture which comprises:

a random access memory (RAM) array;

a random access port for accessing said RAM;

a first serial access memory register (SAM) for reading said RAM, said first SAM having a dedicated first serial port;

a controller having means for clocking data into and out of components in said architecture;

a frame buffer implemented within said RAM comprising means for holding an array of data-words wherein each data-word comprises a specified number of data-units wherein each data-unit comprises a specified number of bits;

means for performing a Bit-block transfer (BitBLT) comprising:

means for choosing from said frame buffer a subset of data to be transferred;

said subset comprising a plurality of said data-units in said frame buffer;

said subset having a leftmost data-unit;

said leftmost data-unit having a source address;

means for choosing a destination address;

said source address corresponding to a first memory location in said frame buffer;

said destination address corresponding to a second memory location in said frame buffer;

means for loading said first SAM register with said subset;

means for calculating a left shift from said source and destination addresses;

means for transferring said subset from said SAM to said frame buffer beginning at said destination address;

wherein said means for transferring said subset from said SAM to said frame buffer comprises:

means for clocking out specific data-units from said SAM into a transfer word;

a serial clock mask having control of said means for clocking out data-units from said SAM, wherein a first of said data-units occupying a portion of said SAM will or will not be clocked out according to a value of a corresponding portion of said serial clock mask;

means for shifting the data-units within said transfer word by said left shift;

means for generating a write enable mask;

means for writing those data-units enabled by said write enable mask within said transfer word to a destination word.

2. The architecture of claim 1, wherein said means for shifting the data-units within said transfer word comprises:

means for generating a shift field according to said left shift; and means for applying said shift field to said transfer word.

3. The architecture of claim 2, wherein said means for applying said shift field comprises:

an alignment unit connected in series between said first SAM register and said random access port.

4. The architecture of claim 3, wherein said means for calculating a left shift comprises:

means for comparing a number of least significant bits (LCB's) of said source and destination addresses, said number of least significant bits being a function of said specified number of bits and said specified number of data-units.

5. The architecture of claim 4 wherein said data-word comprises four data-units, wherein each data-unit comprises 8 bits.

6. The architecture of claim 5, wherein each of said data-units represents a color/intensity value for a specific pixel in a graphical user interface subsystem.

7. The architecture of claim 1, wherein said architecture is implemented on a single integrated circuit chip.

8. The architecture of claim 1, wherein said RAM array and said SAM are implemented using a Triple-Ported Dynamic RAM (TPDRAM) assembly.

9. The architecture of claim 1, wherein said RAM array and said SAM are implemented using a dual ported RAM assembly.

10. The architecture of claim 4, wherein said controller comprises:

a state machine;

means for being interrupted during performance of said BitBLT; and means for restarting said BitBLT at a point of interruption.

11. The architecture of claim 4, wherein said specified number of data-units is variable and said specified number of bits is variable.

12. The architecture of claim 1, wherein said means for transferring said subset further comprises:

a number of transfer cycles;

means for determining the number of transfer cycles; and means for enacting said number of transfer cycles.

13. The architecture of claim 12, wherein said means for determining the number of transfer cycles required comprises:

means for comparing said destination address with the number of data-units in said subset.

14. The architecture of claim 13, wherein said means for generating a write enable mask comprises:

means for comparing during each of said transfer cycles, LSB's of the source and destination addresses, the number of data-units in said subset, and which of said transfer cycles currently being enacted.

15. A method of performing a Bit-block transfer in Random Access Memory (RAM) comprising the steps of:

storing data in said RAM;

arranging data stored in said RAM into an array of data-units grouped into data-words, each of said data-words comprising a specified number of data-units, each of said data-units comprising a specified number of bits;

choosing a subset of said data within said array to be transferred, said subset comprising a plurality of said data-units adjacent in the array;

said subset having a left most data-unit;

assigning to said left most data-unit a source address and a destination address, both of said addresses corresponding to memory locations in said array;

determining the length in data-words of said subset;

loading a serial access memory (SAM) register with said subset;

calculating a left shift from said source and destination addresses;

transferring said subset from said SAM to said array beginning at said destination address;

wherein said step of transferring said subset from said SAM to said array comprises:

generating a serial clock mask;

clocking out specific data-units corresponding to said serial clock mask from said SAM into a transfer word;

shifting the data-units within said transfer word by said left shift;

generating a write enable mask; and, writing those data-units enabled by said write enable mask within said transfer word to a destination word within said array.

16. The method of claim 15, wherein said step of determining the length in data-words of said subset comprises:

comparing the destination address with the number of data-units in said subset.

17. The method of claim 16, wherein said step of shifting the data-units within said transfer word comprises:

generating a shift field; and applying said shift field to said transfer word.

18. The method of claim 17, wherein said step of transferring said subset from said SAM to said array comprises:

implementing four stages wherein:

a first and second of said stages comprise writing a first destination data-word to said array, a third of said stages comprises writing all middle destination-data-words of said subset to said array, and a fourth of said stages comprises writing a last destination word of said subset to said array.

* * * * *

UNITED STATES PATENT AND TRADEMARK OFFICE

CERTIFICATE OF CORRECTION

PATENT NO. : 5,623,624

DATED : Apr. 22, 1997

INVENTOR(S) : Holland et al.

It is certified that error appears in the above-identified patent and that said Letters Patent is hereby corrected as shown below:

On the Cover Page, in the title change "OPTIONS" to --OPERATIONS--

On column 1, line 2, change "OPTIONS" to --OPERATIONS--

On column 1, line 20, change "often times" to --oftentimes--

On column 3, line 50, after "word by word" insert --,-- (comma)

On column 5, line 11, change "The First Cycle" to --The First Cycle--

On column 5, line 41, change "The Second Cycle" to --The Second Cycle--

On column 5, line 42, after "cycle" change the --,-- (comma) to a --.-- (period)

On column 5, line 47, after "transferred" change the --,--(comma) to a --.-- (period)

On column 5, line 48, after "cycle" change the --,-- (comma) to a --.-- (period)

On column 5, line 52, change "The Middle Cycle" to --The Middle Cycle--

On column 5, line 66, change "The Ending Cycle" to --The Ending Cycle--

On column 7, line 10, after "respectively" insert a --,-- (comma)

On column 7, line 26, change "serial-or" to --serial or--

On column 8, line 1, change "commends" to --commands--

On column 8, line 5, change "pixels-out" to --pixels out--

UNITED STATES PATENT AND TRADEMARK OFFICE
CERTIFICATE OF CORRECTION

PATENT NO. : 5,623,624
DATED : Apr. 22, 1997
INVENTOR(S) : Holland et al.

It is certified that error appears in the above-identified patent and that said Letters Patent is hereby corrected as shown below:

In claim 4, line 4, change "(LCB's)" to --(LSB's)--

In claim 14, line 3, after "cycles" delete --,-- (comma)

In claim 14, line 6, after "cycles" insert --is--

In claim 18, line 7, after "nation" delete -- - -- (hyphen)

Signed and Sealed this

Fourteenth Day of July, 1998

Attest:

BRUCE LEHMAN

*Attesting Officer* *Commissioner of Patents and Trademarks*